(12) United States Patent
Okada et al.

(10) Patent No.: US 6,391,413 B1
(45) Date of Patent: May 21, 2002

(54) RAW RUBBER LAPPING FILM

(75) Inventors: Keiji Okada; Yoshiharu Kikuchi; Takashi Hakuta, all of Ichihara (JP)

(73) Assignee: Mitsui Chemicals Inc, Tokyo (JP)

( * ) Notice: Subject to any disclaimer, the term of this patent is extended or adjusted under 35 U.S.C. 154(b) by 0 days.

(21) Appl. No.: 09/514,162

(22) Filed: Feb. 28, 2000

Related U.S. Application Data

(63) Continuation of application No. 09/201,842, filed on Dec. 1, 1998, now abandoned, which is a continuation of application No. 08/644,265, filed on May 10, 1996, now abandoned.

(30) Foreign Application Priority Data

May 12, 1995 (JP) ............................................. 7-114556

(51) Int. Cl.[7] ......................... B32B 27/32; C08F 210/16
(52) U.S. Cl. ..................... 428/36.8; 428/35.7; 428/220; 428/516; 526/348.6; 524/579; 206/83.5; 206/442; 206/524.6
(58) Field of Search ............................... 428/35.7, 36.8, 428/516; 526/348.6; 524/579; 206/83.5, 442, 524.6

(56) References Cited

U.S. PATENT DOCUMENTS

| | | | |
|---|---|---|---|
| 4,814,135 A | | 3/1989 | Heitz |
| 5,091,228 A | * | 2/1992 | Fujii et al. ............ 526/348.1 X |
| 5,206,075 A | * | 4/1993 | Hodgson, Jr. ............ 525/240 X |
| 5,241,030 A | | 8/1993 | Barry et al. |
| 5,296,580 A | | 3/1994 | Matsunaga et al. |
| 5,420,220 A | | 5/1995 | Cheruvu et al. |
| 5,525,659 A | | 6/1996 | Falla et al. |

FOREIGN PATENT DOCUMENTS

| | | |
|---|---|---|
| EP | 0385599 | 9/1990 |
| WO | WO95/09199 | 4/1995 |
| WO | WO 95/09199 * | 4/1995 |

* cited by examiner

*Primary Examiner*—Fred Teskin
(74) *Attorney, Agent, or Firm*—Sherman & Shalloway

(57) ABSTRACT

The present invention provides a raw rubber lapping film formed of an ethylene·α-olefin random copolymer comprising ethylene unit and an α-olefin unit having 4 to 20 carbon atoms and a raw rubber bale lapped with this film. Since the film is superior in strength and release properties and has good dispersibility in ethylene·α-olefin copolymer rubber, the operation of lapping raw rubber with a film, the operation of stripping a film from a lapped raw rubber bale and the operation of separating each of a plurality of raw rubber bales are carried out easily and yet there is no adverse effect on the subsequent rubber processing step without stripping the film by heating at a temperature higher than the melting point of the film at the time of kneading.

24 Claims, 1 Drawing Sheet

RAW RUBBER LAPPING FILM

CROSS-REFERENCE TO RELATED APPLICATIONS

This application is a continuation of application Ser. No. 09/201,842, filed Dec. 1, 1998, now abandoned, which is a continuation of Ser. No. 08/644,265, filed May 10, 1996, now also abandoned.

BACKGROUND OF THE INVENTION

1. Field of the Invention

This invention relates to a film formed of an ethylene-α-olefin random copolymer and used for lapping raw rubber (to be referred to as "a raw rubber lapping film", hereinafter) and to a raw rubber bale lapped with this film.

2. Prior Art

Since ethylene-α-olefin copolymer rubber typified by ethylene-propylene-diene copolymer rubber is superior in strength, heat resistance, weatherability and the like, it is widely used as parts of automobiles and various industrial products. Ethylene-α-olefin copolymer rubber is generally formed into a bale. When it is shipped as a product, it is lapped with a lapping film to prevent entry of foreign matters and the like. Polyethylene such as high-density polyethylene (HDPE) or low-density polyethylene (LDPE) is used as a lapping film. When raw rubber is to be kneaded by a close-system type kneader, it is generally fed into the kneader without removing a lapping film and kneaded with a filler, oil and the like. At this time, in a case of a compounding in which the viscosity of the raw rubber is low or when a large amount of oil is added, kneading temperature does not go up to a sufficiently high level in most cases. Therefore, the polyethylene lapping film fed together with raw rubber can not fuse completely during kneading and remain in the compound as an undispersed foreign matter, thereby causing a trouble at the raw rubber processing step.

Therefore, as for compounding in which kneading temperature does not go up sufficiently, the lapping film is stripped before ethylene-α-olefin copolymer rubber is fed into a kneader in most cases. However, in a case of a bale of ethylene-α-olefin copolymer rubber having low viscosity in particular, a lapping film if firmly adhered to the bale and hence, it takes time to strip the lapping film from the raw rubber, thereby deteriorating workability.

Because of the above reason, studies have been made on improvement of various types of lapping films. When a low-melting resin is used as a lapping film, it can not be formed into a film or even when it is formed into a film, the resulting film has a low strength and cannot be used as a lapping film. Further, when a raw rubber bale is lapped with a low-melting film and stored for a prolong time, there occurs such a problem that lapping films adhere to one another by fusion and consequently, a plurality of bales cannot be separated from one another.

SUMMARY OF THE INVENTION

It is therefore an object of the present invention to provide a novel raw rubber lapping film.

It is another object of the present invention to provide a raw rubber lapping film which has a low melting point and is superior in strength and release properties.

It is still another object of the present invention to provide a raw rubber lapping film which is well dispersed in ethylene-α-olefin copolymer rubber even when an ethylene-α-olefin copolymer rubber bale lapped with a raw rubber lapping film is kneaded without stripping the film from the bale, and is free from a trouble in the subsequent rubber processing step.

It is a further object of the present invention to provide a raw rubber bale lapped with the raw rubber lapping film of the present invention, that is, a lapped raw rubber bale of which a raw rubber lapping film can be easily separated from the raw rubber and which can be easily separated from one another.

Other objects and advantages of the present invention will become apparent from the following description.

According to the present invention, the above objects and advantages of the present invention can be accomplished by a raw rubber lapping film formed of an ethylene-α-olefin copolymer comprising an ethylene unit and an α-olefin unit having 4 to 20 carbon atoms and by a raw rubber bale lapped with this raw rubber lapping film.

DETAILED DESCRIPTION OF THE INVENTION

Figure 1:
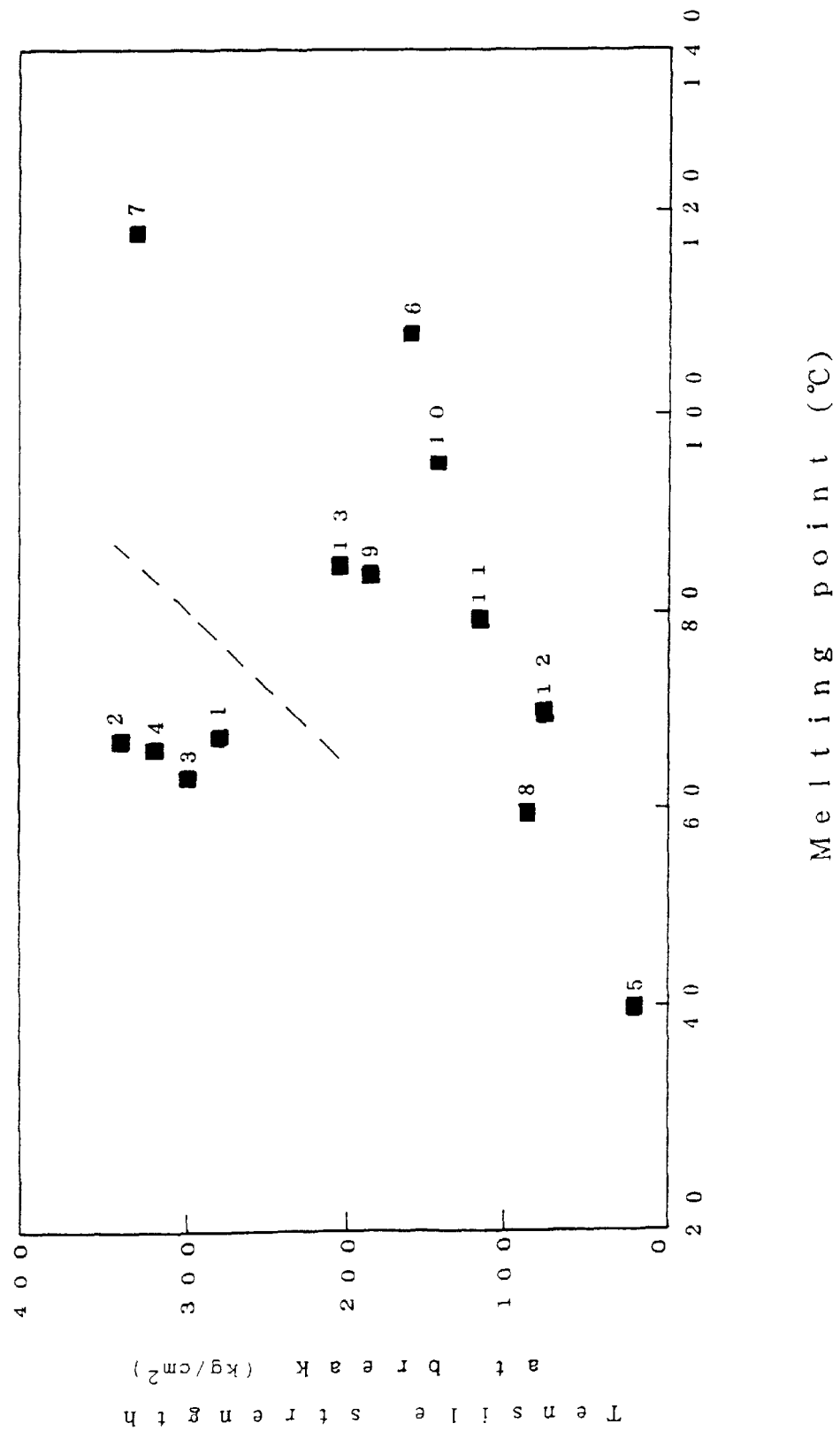
FIG. 1 is a graph showing the melting points and tensile strengths at break of various types of polymers.

The raw rubber lapping film of the present invention, as described above, is formed of an ethylene-α-olefin random copolymer of ethylene and an α-olefin having 4 to 20 carbon atoms, preferably 4 to 8 carbon atoms.

Illustrative examples of the α-olefin include butene-1, pentene-1, 4-methylpentene-1, hexene-1, heptene-1, octene-1, nonene-1, decene-1, undecene-1, dodecene-1, tridecene-1, tetradecene-1, pentadecene-1, hexadecene-1, heptadecene-1, nonadecene-1, eicosene-1, 9-methyl-decene-1, 11-methyl-dodecene-1, 12-ethyl-tetradecene-1 and the like, among which butene-1, hexene-1 and octene-1 are preferred.

These α-olefins may be used alone or in combination of two or more.

In the ethylene-α-olefin copolymer, other polymerizable component(s) may be copolymerized in addition to the above olefin monomers, in limits prejudicial to the accomplishment of the object of the present invention. Such copolymerizable component(s) are (is) contained in the copolymer in an amount of not more than 10 mol %, preferably not more than 5 mol %.

Illustrative examples of the copolymerizable component include 5-ethylidene norbornene, dicyclopentadiene, 1,4-hexadiene, 3-methyl-1,4-hexadiene, 4-methyl-1,4-hexadiene, 5-methyl-1,4-hexadiene, 4,5-dimethyl-1,4-hexadiene, 5-methyl-2-norbornene, 5-isopropylindene-2-norbornene, 5-vinylidene-2-norbornene, 5-vinyl-2-norbornene and the like, among which, 5-ethylidene norbornene and dicyclopentadiene are preferred.

The molar ratio of ethylene units to α-olefin units constituting the ethylene-α-olefin random copolymer is normally 80/20 to 95/5, preferably 82/18 to 92/8.

The MFR (melt flow rate) of the ethylene-α-olefin random copolymer at 190° C. under a load of 2.16 kg may be normally 0.1 to 50 g/10 min., preferably 0.1 to 10 g/10 min. in consideration of balance between the strength of the raw rubber lapping film and processability of the copolymer.

The melting point measured by DSC of the ethylene-α-olefin random copolymer may be normally 50 to 100° C., preferably 60 to 90° C. With a melting point within the above range, the lapping film can easily fuse and disperse in the copolymer rubber appropriately when a copolymer rubber bale lapped with the lapping film of the present invention is kneaded without stripping the lapping film, and furthermore, the obtained film can have the more excellent strength and release properties.

The ethylene·α-olefin random copolymer for producing a raw rubber lapping film which has been described in detail can be produced by a method known per se.

Preferably, the raw rubber lapping film of the present invention contains an anti-blocking agent and a slip agent.

Illustrative examples of the anti-blocking agent include synthetic silica such as dry silica and wet silica, natural silica such as diatomaceous earth, silicon resin, polymethyl methacrylate (PMMA) or the like. The anti-blocking agent is preferably contained in the film in an amount of 0.01 to 1.0% by weight of the ethylene·α-olefin random copolymer.

Illustrative examples of the slip agent include a fatty acid such as stearic acid, oleic acid or the like; a fatty acid amide such as oleylamide, erucylamide, ricinolamide, beheneamide or the like; a fatty acid ester such as glycerin esters and sorbitan esters of higher fatty acids and n-butyl stearate or the like. The slip agent is preferably contained in the film in an amount of 0.01 to 1.0% by weight of the ethylene·α-olefin random copolymer.

The lapping film of the present invention may contain a resin such as polyethylene or polybutene, an ultraviolet absorber, an antioxidant, a flame retarder, a coloring agent, an antistatic agent, a reinforcing agent, a filler, a softener or the like.

The lapping film of the present invention can be produced by a known method which comprises mixing an ethylene·α-olefin random copolymer and the above components with a Henschel mixer or the like, kneading these components with a kneader and forming into a film with a film forming machine such as a T-die extruder or an inflation forming machine. Kneading the copolymer and the other component and forming into a film may be carried out in a single step using a film forming machine.

As the kneader, a mixing roll, intensive mixer (such as Banbury mixer or kneader) or single- or double-screw extruder is used. Above all, a close system type kneader is preferred.

The thickness of the raw rubber lapping film of the present invention may be normally 20 to 100 μm, preferably 30 to 60 μm. The width of the film, which varies according to the size of a raw rubber bale to be lapped, may be normally 50 to 100 cm.

In this way, a film formed to a specific thickness and a specific width is taken up and loaded onto an automatic lapping machine or manually to lap a raw rubber bale formed into a predetermined shape.

The raw rubber bale may have, for example, a width of about 300 to 400 mm and a length of about 100 to 250 mm in a rectangular section and has a length of about 500 to 1,000 mm.

Kinds of raw rubber to be lapped with the raw rubber lapping film of the present invention include ethylene·α-olefin copolymer rubber such as ethylene·propylene copolymer rubber (EP rubber) and ethylene·conjugated diene copolymer rubber (EPDM), NBR, SBR, BR, butyl rubber, butadiene rubber, CSM (chlorosulfonated polyethylene rubber), acryl rubber and the like. Above all, the raw rubber lapping film of the present invention is preferably used for lapping a bale of the ethylene·α-olefin copolymer rubber. A method of lapping a raw rubber bale is performed by a method known per se.

The raw rubber bale lapped with the raw rubber lapping film of the present invention is kneaded with compounding agent(s) such as oil or a filler in a kneader by stripping or without stripping the raw rubber lapping film.

When compounding conditions in which temperature goes up to such a level that a raw rubber lapping film fuses during kneading are adopted, the raw rubber lapping film of the present invention is uniformly dispersed in raw rubber without being stripped and does not give an adverse effect on the subsequent step of forming rubber. This advantage is much more obtained when the raw rubber is ethylene·α-olefin copolymer rubber.

When compounding conditions in which temperature does not go up to a level that a raw rubber lapping film fuses during kneading are adopted, the raw rubber lapping film is stripped from a raw rubber bale. Stripping is carried out easily.

Such a trouble that when raw rubber bales are heaped up and are left to stand for a long time, raw rubber lapping films are adhered to one another by fusion and the raw rubber bales cannot be separated from one another can be substantially eliminated by using the raw rubber lapping film of the present invention.

The raw rubber kneaded in this manner is vulcanized to produce sponge parts for automobiles such as sealing and corner materials, industrial rubber products such as a rubber roll, electric insulating materials, construction materials and the like.

To further illustrate this invention, and not by way of limitation, the following examples are given.

The measurement methods of physical properties which were carried out in Examples and Comparative Examples are as follows.

[Measurement methods of physical properties]
- (1) Melt flow rate (MFR): measured at 190° C. under a load of 2.16 kg in accordance with ASTM D1238
- (2) Density: measured in accordance with ASTM D1505
- (3) Tensile strength at break of sheet physical properties: measured in accordance with ASTM D638
- (4) Melting point and tensile strength at break of film physical properties: measured in accordance with JIS K 7121
- (5) Elmendorf tear test of film physical properties: measured in accordance with JIS K 7128

[Physical properties of various types of ethylene polymers]

About 2 mm thick sheets were prepared from ethylene polymers below (Polymers Nos.1 to 13) by a melt extrusion method. The tensile strengths at break and melting point of these sheets at 23° C. were measured. Results are shown in FIG. 1. In FIG. 1, the numeral indicates polymer number.

(Polymer No.1)
ethylene·butene-1 copolymer
molar ratio of ethylene to butene-1: 90/10
MFR: 4.0 g/10 min.
(Polymer No.2)
ethylene·butene-1 copolymer
molar ratio of ethylene to butene-1: 90/10
MFR: 1.0 g/10 min.
(Polymer No.3)
ethylene·hexene-1 copolymer
molar ratio of ethylene to hexene-1: 88/12

MFR: 1.8 g/10 min.
(Polymer No.4)
ethylene-octene-1 copolymer
molar ratio of ethylene to octene-1: 92/8
MFR: 2.6 g/10 min.
(Polymer No.5)
ethylene-propylene random copolymer
molar ratio of ethylene to propylene: 82/18
MFR: 2.0 g/10 min.
(Polymer No.6)
LDPE (high-pressure-polymerized low-density polyethylene)
MFR: 2.0 g/10 min.
density: 0.92
(Polymer No.7)
LLDPE (low-pressure-polymerized low-density polyethylene)
MFR: 2.1 g/10 min.
density: 0.92
(Polymer No.8)
EVA (ethylene-vinyl acetate copolymer)
content of vinyl acetate: 33 wt %
MFR: 30 g/10 min.
(Polymer No.9)
EVA (ethylene-vinyl acetate copolymer)
content of vinyl acetate: 19 wt %
MFR: 2.5 g/10 min.
(Polymer No.10)
EEA (ethylene-ethyl acrylate copolymer)
content of ethyl acrylate: 9 wt %
MFR: 5 g/10 min.
(Polymer No.11)
EEA (ethylene-ethyl acrylate copolymer)
content of ethyl acrylate: 19 wt %
MFR: 5 g/10 min.
(Polymer No.12)
EEA (ethylene-ethyl acrylate copolymer)
content of ethyl acrylate: 25 wt %
MFR: 5 g/10 min.
(Polymer No.13)
EEA (ethylene-ethyl acrylate copolymer)
content of ethyl acrylate: 15 wt %
MFR: 0.5 g/10 min.

It is understood from FIG. 1 that the ethylene-α-olefin copolymers of Polymers No.1 to No.4 have melting points within an appropriate range and high strength and are suitable for use as a material of a raw rubber lapping film.

EXAMPLE 1

After compounding components shown in Table 1 were sufficiently mixed in a Henschel mixer, a 100 μm thick and 1 m wide film was formed with a T die film forming machine having a head temperature adjusted to 200° C.

TABLE 1

| Compounding components | parts by weight |
|---|---|
| Ethylene.butene-1 copolymer 1) | 100.0 |
| Silica 2) | 0.1 |
| Erucylamide | 0.1 |

Notes:

TABLE 1-continued

| Compounding components | parts by weight |
|---|---|

1) molar ratio of ethylene to butene-1: 90/10 MFR: 4.0 g/10 min. melting point: 68° C.
2) dry silica: average particle size of 2 μm

EXAMPLE 2

After compounding components shown in Table 2 were sufficiently mixed in a Henschel mixer, a 50 μm thick and 1 m wide film was formed using an inflation forming machine.

TABLE 2

| Compounding components | parts by weight |
|---|---|
| Ethylene.butene-1 random copolymer 1) | 100.0 |
| Silica 2) | 0.1 |
| Erucylamide | 0.1 |

Notes:
1) molar ratio of ethylene to 1-butene: 92/8 MFR: 1.0 g/10 min. melting point: 69° C.
2) dry silica: average particle size of 2 μm

COMPARATIVE EXAMPLE 1

A film was formed in the same manner as in Example 2 except that LDPE having the following physical properties was used in place of the ethylene-1-butene random copolymer. The physical properties of the film are shown in Table 3 together with the physical properties of a film prepared in Example 1.
MFR: 2.0 g/10 min.
density: 0.92
melting point: 108° C.

TABLE 3

| Physical properties | Example 1 | Comp. Example 1 |
|---|---|---|
| Melting point (° C.) | 69 | 108 |
| Tensile properties (measured at 23° C.) Tensile strength at break | | |
| MD (kgf/cm²) | 634 | 227 |
| TD (kgf/cm²) | 684 | 232 |
| Elongation at break | | |
| MD (%) | 450 | 290 |
| TD (%) | 480 | 440 |
| Elmendorf tear strength | | |
| MD (kgf/cm) | 13 | 34 |
| TD (kgf/cm) | 15 | 34 |

Comp. Example = Comparative Example

COMPARATIVE EXAMPLE 2

A film was formed in the same manner as in Example 2 except that an ethylene-propylene random copolymer having the following physical properties was used in place of the ethylene-1-butene random copolymer.
molar ratio of ethylene to propylene: 82/18
MFR: 2.0 g/10 min.

COMPARATIVE EXAMPLE 3

A film was formed in the same manner as in Example 2 except that LLDPE having the following physical properties was used in place of the ethylene-1-butene random copolymer.

molar ratio of ethylene to 1-butene: 98/2

MFR: 2.1 g/10 min.

melting point: 120° C.

[Lapping to raw rubber bale]

2 m of each of the films prepared in Examples 1 and 2 and Comparative Examples 1 to 3 was used to lap a 20 kg bale of ethylene·propylene copolymer rubber having a Mooney viscosity of 10, an iodine value (IV) of 22 and an ethylene content of 70 mol %. State of a film lapped to the bale (film breakage) at the time of lapping was evaluated. Next, the dispersion of the film after compounding components shown in Table 4 were kneaded in a Banbury mixer for 1.5 minutes was evaluated. Further, five bales of an ethylene·propylene copolymer rubber lapped with the film obtained in Example 1 were prepared. Similarly, five ethylene·propylene copolymer rubber bales lapped with each of the films obtained in Example 2 and Comparative Examples 1 to 3 were prepared. These 5 bales were respectively heaped up. Plates were set around the bales so that the raw rubber was not allowed to flow, and the bales were left to stand for 2 months to evaluate easiness of the separation of the bales from one another. Results are shown in Table 5.

TABLE 4

| Compounding components | parts by weight |
| --- | --- |
| Ethylene.propylene copolymer rubber | 100.0 |
| Stearic acid | 2.0 |
| Zinc oxide | 5.0 |
| SFR carbon black | 70.0 |
| Paraffin oil | 50.0 |

TABLE 5

| | Example | | Comparative example | | |
| --- | --- | --- | --- | --- | --- |
| | 1 | 2 | 1 | 2 | 3 |
| Dispersibility of Film | ○ | ○ | X | ○ | X |
| Breakage of film lapped | ○ | ○ | ○ | X | ○ |
| Easiness of separation of bales after standing | ○ | ○ | ○ | Δ | ○ |

In Table 5, the results of evaluations based on the following criteria are shown.

<Dispersibility of film>

○: A film was fused and uniformly dispersed in raw rubber when a mixture was dumped out from a Banbury mixer after kneading under fusion.

X: A film was not fused and remained undispersed.

<Breakage of film lapped>

○: Normal lapping could be carried out with a lapping machine.

X: When lapping is carried out with a lapping machine, a bale lapped with a film was rubbed on the wall of a lapping machine, whereby the film was torn.

<Bale release properties after standing>

○: Bales were easily separated after they were heaped up and left to stand.

Δ: The films of upper and lower bales sticked to each other slightly, but the bales were separated from each other.

X: The films of upper and lower bales sticked to each other and the bales could not be separated from each other.

As is evident from the above examples, the raw rubber lapping film of the present invention has the following advantages.

(1) Since it has high strength, lapping operation can be carried out with trouble.

(2) Since it has excellent release properties, it can be easily separated from a raw rubber bale as required and raw rubber can be sent to a processing step. Even when raw rubber bales are heaped up for a long time, they can be easily separated from one another.

(3) Since it has excellent dispersability in ethylene·α-olefin copolymer rubber, when temperature is elevated to a level above the melting point of the film at the time of kneading under fusion of the raw rubber, the film is uniformly dispersed in the raw rubber without stripping the film from the raw rubber bale and no trouble is produced in the subsequent processing step.

What is claimed is:

1. An improved method for lapping a raw rubber bale wherein the improvement comprises lapping the raw rubber bale with a raw rubber lapping film consisting essentially of an ethylene·α-olefin random copolymer which comprises ethylene units and α-olefin units, each α-olefin unit having 4 to 20 carbon atoms, the molar ratio of ethylene units to α-olefin units being from 82/18 to 92/8, wherein said ethylene·α-olefin random copolymer has an MFR, measured at 190° C. under a load of 2.16 kg, of 0.1 to 50 g/10 min.

2. The improved method according to claim 1, wherein the α-olefin is at least one selected from the group consisting of butene-1, hexene-1, and octene-1.

3. The improved method according to claim 1, wherein said raw rubber lapping film contains an anti-blocking agent in an amount of 0.01 to 1.0% by weight and a slip agent in an amount of 0.1 to 1% by weight, based on said ethylene·α-olefin random copolymer.

4. The improved method according to claim 1, wherein said raw rubber lapping film has a thickness of 20 to 100 μm.

5. A raw rubber bale lapped with a raw rubber lapping film consisting essentially of an ethylene·α-olefin random copolymer which comprises ethylene units and α-olefin units, each α-olefin unit having 4 to 20 carbon atoms, the molar ratio of ethylene units to α-olefin units being from 82/18 to 92/8, wherein said ethylene·α-olefin random copolymer has an MFR, measured at 190° C. under a load of 2.16 kg, of 0.1 to 50 g/10 min.

6. The raw rubber bale according to claim 5, wherein said raw rubber lapping film has a thickness of 20 to 100 μm.

7. The raw rubber bale according to claim 5, wherein said raw rubber is an ethylene·α-olefin copolymer rubber.

8. An improved method for lapping a raw rubber bale wherein the improvement comprises lapping the raw rubber bale with a raw rubber lapping film comprising, as a sole film-forming material, an ethylene·α-olefin random copolymer which comprises ethylene units and α-olefin units, each α-olefin unit having 4 to 8 carbon atoms, the molar ratio of ethylene units to α-olefin units being from 82/18 to 92/8, wherein said ethylene·α-olefin random copolymer has an MFR, measured at 190° C. under a load of 2.16 kg, of 0.1 to 50 g/10 min.

9. The improved method according to claim 8, wherein the α-olefin is at least one selected from the group consisting of butene-1, hexene-1 and octene-1.

10. The improved method according to claim 8, wherein said raw rubber lapping film contains an anti-blocking agent in an amount of 0.01 to 1.0% by weight and a slip agent in an amount of 0.01 to 1% by weight, based on said ethylene·α-olefin random copolymer.

11. The improved method according to claim 10, wherein said raw rubber lapping film has a thickness of 20 to 100 μm.

12. A raw rubber bale lapped with a raw rubber lapping film comprising, as a sole film-forming material, an ethylene·α-olefin random copolymer which comprises ethylene units and α-olefin units, each α-olefin unit having 4 to 8 carbon atoms, the molar ratio of ethylene units to α-olefin units being from 82/18 to 92/8, wherein said ethylene·α-olefin copolymer has an MFR, measured at 190° C. under a load of 2.16 kg, of 0.1 to 50 g/10 min.

13. The raw rubber bale according to claim 12, wherein the α-olefin is at least one selected from the group consisting of butene-1, hexene-1 and octene-1.

14. The raw rubber bale according to claim 12, wherein said raw rubber lapping film has a thickness of 20 to 100 μm.

15. The raw rubber bale according to claim 12, wherein said raw rubber is an ethylene·α-olefin copolymer rubber.

16. An improved method for lapping a raw rubber bale wherein the improvement comprises lapping the raw rubber bale with a raw rubber lapping film consisting of an ethylene·α-olefin random copolymer which comprises ethylene units and α-olefin units, each α-olefin unit having 4 to 8 carbon atoms, the molar ratio of ethylene units to α-olefin units being from 82/18 to 92/8, wherein said ethylene·α-olefin random copolymer has an MFR, measured at 190° C. under a load of 2.16 kg, of 0.1 to 10 g/10 min., an anti-blocking agent in an amount of 0.01 to 1.0% by weight of said ethylene·α-olefin random copolymer, a slip agent in an amount of 0.1 to 1.0% by weight of said ethylene·α-olefin random copolymer, and one or more additives selected from the group consisting of an ultraviolet absorber, an antioxidant, a flame retarder, a coloring agent, an anti-static agent, a reinforcing agent, a filler and a softener.

17. A raw rubber bale lapped with a raw rubber lapping film consisting of an ethylene·α-olefin random copolymer which comprises ethylene units and α-olefin units, each α-olefin unit having 4 to 10 carbon atoms, the molar ratio of ethylene units being from 82/18 to 92/8, wherein said ethylene·α-olefin random copolymer has an MFR, measured at 190° C. under a load of 2.16 kg, of 0.1 to 10 g/10 min., an anti-blocking agent in an amount of 0.01 to 1.0% by weight of said ethylene·α-olefin random copolymer, a slip agent in an amount of 0.1 to 1.0% by weight of said ethylene·α-olefin random copolymer, and one or more additives selected from the group consisting of an ultraviolet absorber, an antioxidant, a flame retarder, a coloring agent, an anti-static agent, a reinforcing agent, a filler and a softener.

18. The improved method according to claim 1, wherein said ethylene·α-olefin random copolymer has a melting point of 50 to 100° C.

19. The raw rubber bale according to claim 5, wherein said ethylene·α-olefin random copolymer has a melting point of 50 to 100° C.

20. The improved method according to claim 8, wherein said ethylene·α-olefin random copolymer has a melting point of 50 to 100° C.

21. The raw rubber bale according to claim 12, wherein said ethylene·α-olefin random copolymer has a melting point of 50 to 100° C.

22. The improved method according to claim 16, wherein said ethylene·α-olefin random copolymer has a melting point of 60 to 90° C.

23. The raw rubber bale according to claim 17, wherein said ethylene·α-olefin random copolymer has a melting point of 60 to 90° C.

24. The raw rubber bale according to claim 5 wherein the α-olefin is at least one selected from the group consisting of butene-1, hexene-1 and octene-1.

* * * * *